United States Patent
Yamamoto

(10) Patent No.: US 10,381,629 B2
(45) Date of Patent: Aug. 13, 2019

(54) MOVABLE BODY EQUIPPED WITH BATTERY

(71) Applicant: TOYOTA JIDOSHA KABUSHIKI KAISHA, Toyota-shi, Aichi-ken (JP)

(72) Inventor: Satomi Yamamoto, Miyoshi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 148 days.

(21) Appl. No.: 15/433,305

(22) Filed: Feb. 15, 2017

(65) Prior Publication Data

US 2017/0237058 A1    Aug. 17, 2017

(30) Foreign Application Priority Data

Feb. 16, 2016  (JP) ................... 2016-026862

(51) Int. Cl.
| | |
|---|---|
| *H01M 2/34* | (2006.01) |
| *H01M 2/10* | (2006.01) |
| *H01M 2/30* | (2006.01) |
| *H01M 2/20* | (2006.01) |

(52) U.S. Cl.
CPC ......... *H01M 2/345* (2013.01); *H01M 2/1077* (2013.01); *H01M 2/206* (2013.01); *H01M 2/30* (2013.01); *H01M 2/305* (2013.01); *H01M 2200/20* (2013.01); *H01M 2220/20* (2013.01)

(58) Field of Classification Search
CPC .... H01M 2/1077; H01M 2/206; H01M 2/345; H01M 2/30
See application file for complete search history.

(56) References Cited

U.S. PATENT DOCUMENTS

| | | | |
|---|---|---|---|
| 2014/0342200 | A1 | 11/2014 | Morita et al. |
| 2016/0133995 | A1 | 5/2016 | Hattori et al. |

FOREIGN PATENT DOCUMENTS

| | | |
|---|---|---|
| CN | 104054207 A | 9/2014 |
| CN | 105324881 A | 2/2016 |
| JP | 2008-103268 A | 5/2008 |
| WO | 2013/108365 A1 | 7/2013 |
| WO | 2015001718 A1 | 1/2015 |

*Primary Examiner* — Olatunji A Godo
(74) *Attorney, Agent, or Firm* — Sughrue Mion, PLLC

(57) ABSTRACT

A battery includes: positive and negative electrode terminals at least partially provided outside an outer packaging body; and a current cut-off device placed inside the outer packaging body. The current cut-off device is provided in either one of the positive and negative electrode terminals and cuts off an electric current path between the battery element and the either one of the positive and negative electrode when a pressure in the outer packaging body increases. The battery is provided in the movable body such that the either one of the positive and negative electrode terminals provided with the current cut-off device is placed on a vertically upper side relative to the other one of them. The current cut-off device is placed on the vertically upper side relative to a liquid level of the electrolytic solution.

4 Claims, 12 Drawing Sheets

COMPARATIVE EXAMPLE

COMPARATIVE EXAMPLE

COMPARATIVE EXAMPLE

MOVABLE BODY EQUIPPED WITH BATTERY

INCORPORATION BY REFERENCE

The disclosure of Japanese Patent Application No. 2016-026862 filed on Feb. 16, 2016 including the specification, drawings and abstract is incorporated herein by reference in its entirety.

BACKGROUND

1. Technical Field

The present invention relates to a movable body equipped with a battery, and more particularly, to a movable body equipped with a secondary battery including a current cut-off device.

2. Description of Related Art

As to a battery, Japanese Patent Application Publication No. 2008-103268 (JP 2008-103268 A) describes an assembled battery constituted by a plurality of single cells. International Publication No. 2013/108365 describes a current cut-off device that constitutes a conductive path when an internal pressure of a battery increases.

In a current cut-off mechanism, when a pressure in a battery outer case increases, a current is cut off by cutting a metal plate constituting a conductive path.

SUMMARY

However, there is such a problem that flexibility in mounting of a battery including a current cut-off device is low. The present disclosure provides a movable body equipped with a battery, and the movable body has a high flexibility in mounting of the battery.

An aspect of the present disclosure relates to a movable body equipped with a battery as a power source. The battery includes: a battery element; an outer packaging body configured to accommodate the battery element; an electrolytic solution enclosed inside the outer packaging body; a positive electrode terminal and a negative electrode terminal at least partially provided outside the outer packaging body and electrically connected to the battery element; and a current cut-off device placed inside the outer packaging body, the current cut-off device being provided only in either one of the positive electrode terminal and the negative electrode terminal so as to form an electric current path between the battery element and the either one of the positive electrode terminal and the negative electrode terminal, the current cut-off device being configured to cut off the electric current path when a pressure in the outer packaging body increases. The battery is provided in the movable body such that the either one of the positive electrode terminal and the negative electrode terminal, the either one being provided with the current cut-off device, is placed on a vertically upper side relative to the other one of the positive electrode terminal and the negative electrode terminal, and the current cut-off device is placed on the vertically upper side relative to a liquid level of the electrolytic solution. Note that the "vertically upper side" indicates that, when two members are compared with each other, a position of one of them in a vertical direction is placed above a position of the other one in the vertical direction. It is not necessary that the two members be placed on the same vertical line. This is not limited to a case where the other member is placed right above the one member, but also includes a case where the one member is placed on a position deviating from a position right above the other member. To be "provided only in either one of the positive electrode terminal and the negative electrode terminal" includes a case of being provided so as to be make contact with only either one of the positive electrode terminal and the negative electrode terminal and a case of being provided adjacent to only either one of the positive electrode terminal and the negative electrode terminal.

In the movable body equipped with the battery configured as such, the battery can be provided in the moving body such that either one of the positive electrode terminal and the negative electrode terminal, which is provided with the current cut-off device, is placed on the vertically upper side relative to the other one of them, so a flexibility in mounting increases. Further, the electrode terminal provided with the current cut-off device is placed on the vertically upper side relative to the electrode terminal not provided with the current cut-off device, so the current cut-off device can be hardly immersed in the electrolytic solution. As a result, it is possible to reduce a possibility of reconduction by the electrolytic solution.

The movable body may include a plurality of batteries including a first battery and a second battery. The plurality of batteries may be connected in series so as to constitute an assembled battery. The movable body may be equipped with the assembled battery. The current cut-off devices of the first battery and the second battery may be provided respectively in the positive electrode terminals of the first battery and the second battery or provide respectively the negative electrode terminals of the first battery and the second battery. The assembled battery may include a bus bar that connects the first battery to the second battery in series.

In this case, since the first and second batteries have the same structure in terms of the current cut-off device, it is possible to constitute the assembled battery by combining a plurality of batteries of the same type.

The movable body may include a plurality of batteries including a first battery and a second battery. The plurality of batteries may be connected in series so as to constitute an assembled battery. The movable body may be equipped with the assembled battery. The assembled battery may be configured such that: the current cut-off device of the first battery is provided only in the positive electrode terminal of the first battery; the current cut-off device of the second battery is provided only in the negative electrode terminal of the second battery; the first battery and the second battery are stacked alternately; and a distance between the positive electrode terminal of the first battery and the negative electrode terminal of the second battery is shorter than a distance between the positive electrode terminal of the first battery and the positive electrode terminal of the second battery. The assembled battery includes a bus bar that connects the positive electrode terminal of the first battery to the negative electrode terminal of the second battery.

In this case, the positive electrode terminal of the first battery is adjacent to the negative electrode terminal of the second battery and they are connected via the bus bar, thereby making it possible to shorten a length of the bus bar.

The first battery may be prismatic, the positive electrode terminal and the negative electrode terminal of the first battery may be provided on the same first plane, the first plane being an outer surface of the first battery, the second battery may be prismatic, the positive electrode terminal and the negative electrode terminal of the second battery may be provided on the same second plane, the second plane being an outer surface of the second battery, the first battery and the second battery may have the same outer shape, and in the assembled battery, the first battery and the second battery may be stacked such that the first plane and the second plane are placed on the same plane. In this case, it is possible to provide the first battery and the second battery in the movable body with a high density per unit volume. Further, even in a case where batteries including respective current cut-off devices provided on the same electrode side are stacked or even in a case where batteries including respective current cut-off devices provided on different electrode sides are stacked, it is possible to laminate the batteries with a high density, thereby making it possible to shorten a length of the bus bar connecting the electrodes. Note that the "prismatic shape" indicates a generally prismatic-like solid shape constituted by planes including a plane on which the positive electrode terminal and the negative electrode terminal are provided.

According to the present disclosure, it is possible to provide a movable body equipped with a battery that is able to prevent conduction after a current is cut off by a current cut-off device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments are described below with reference to the drawings. In a case where a number, an amount, and the like are mentioned, the scope of the present disclosure is not necessarily limited to the number, the amount, and the like, unless otherwise specified. The same reference sign is assigned to the same component and its equivalent component, and a redundant description may not be repeated. Further, the drawings are not illustrated according to an actual dimensional ratio, but illustrated by changing the ratio so as to clarify a structure, in order to facilitate understanding of the structure.

(Structure of Movable Body Equipped with Battery according to First Embodiment)

Figure 1:
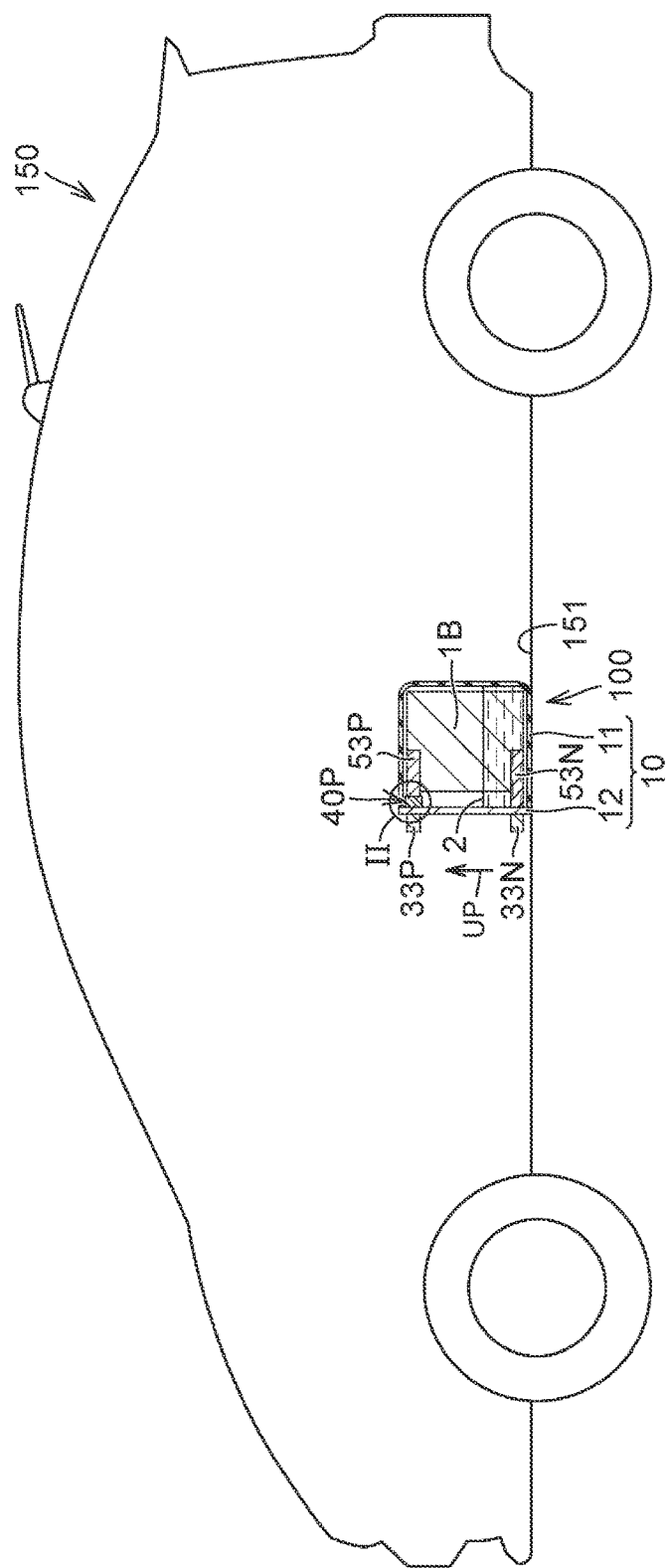
FIG. 1 is a sectional view of a movable body equipped with a first battery according to a first embodiment.

FIG. 1 is a sectional view of a movable body equipped with a first battery according to the first embodiment. A prismatic battery 100, which is a secondary battery, is provided on a mounting surface 151 of a movable body 150. A direction indicated by an arrow "UP" is a vertically upward direction.

The movable body 150 is a vehicle in this example. The vehicle is not limited to an automobile illustrated in FIG. 1, but may be a motor bicycle, a motorcycle, a railway vehicle, a vessel, a personal mobility, and the like. The movable body 150 uses the battery 100 as a power source. The movable body 150 may use power sources other than the battery 100 as the power source. The movable body 150 may be an electric vehicle that uses only the battery 100 as a power source, or may be a hybrid vehicle including a power source other than the battery 100.

The battery 100 includes: a battery element 1B; an outer packaging body 10 for accommodating the battery element 1B; a negative electrode terminal 33N and a positive electrode terminal 33P at least partially provided outside the outer packaging body 10 and electrically connected to the battery element 1B; a negative electrode collector 53N electrically connected to the negative electrode terminal 33N; a positive electrode collector 53P electrically connected to the positive electrode terminal 33P; and an electrolytic solution 2 enclosed in the outer packaging body 10.

When the battery 100 is provided in the movable body 150, a mounting space is limited. It is desired that the battery 100 be provided in the movable body 150 as compactly as possible. In FIG. 1, the positive electrode terminal 33P and the negative electrode terminal 33N of the battery 100 are provided in the movable body so as to be placed on a side face of the secondary battery. That is, the battery 100 is provided in a lateral manner.

The battery element 1B is constituted by stacking positive and negative electrode plates via a separator. The outer packaging body 10 accommodates the battery element (electrode body) 1B therein. The outer packaging body 10 includes a receptacle portion 11 and a sealing plate 12. The receptacle portion 11 has a generally prismatic-like solid case shape that is opened in one direction, and constitutes an outer packaging body for the battery 100. The battery element 1B is accommodated in the receptacle portion 11, together with the electrolytic solution 2.

The sealing plate 12 has a plate shape having a generally rectangular plan view and is placed in an opening provided in the receptacle portion 11. The sealing plate 12 is provided so as to close the opening of the receptacle portion 11. The receptacle portion 11 and the sealing plate 12 form a sealed space in which to accommodate the battery element 1B. The receptacle portion 11 and the sealing plate 12 are made of a metallic material such as aluminum.

The negative electrode terminal 33N and the positive electrode terminal 33P are provided outside the outer packaging body 10 as external terminals of the battery 100. The negative electrode terminal 33N and the positive electrode terminal 33P are attached to the sealing plate 12.

The battery 100 includes a current cut-off device 40P for cutting off a current flow between the battery element 1B and the positive electrode terminal 33P when a pressure in the outer packaging body 10 increases. The current cut-off device 40P is placed above a liquid level of the electrolytic solution 2. The current cut-off device 40P is provided only in either one of the negative electrode terminal 33N and the positive electrode terminal 33P. The present embodiment typically describes a case where the positive electrode terminal 33P is provided with the current cut-off device 40P.

Figure 2:
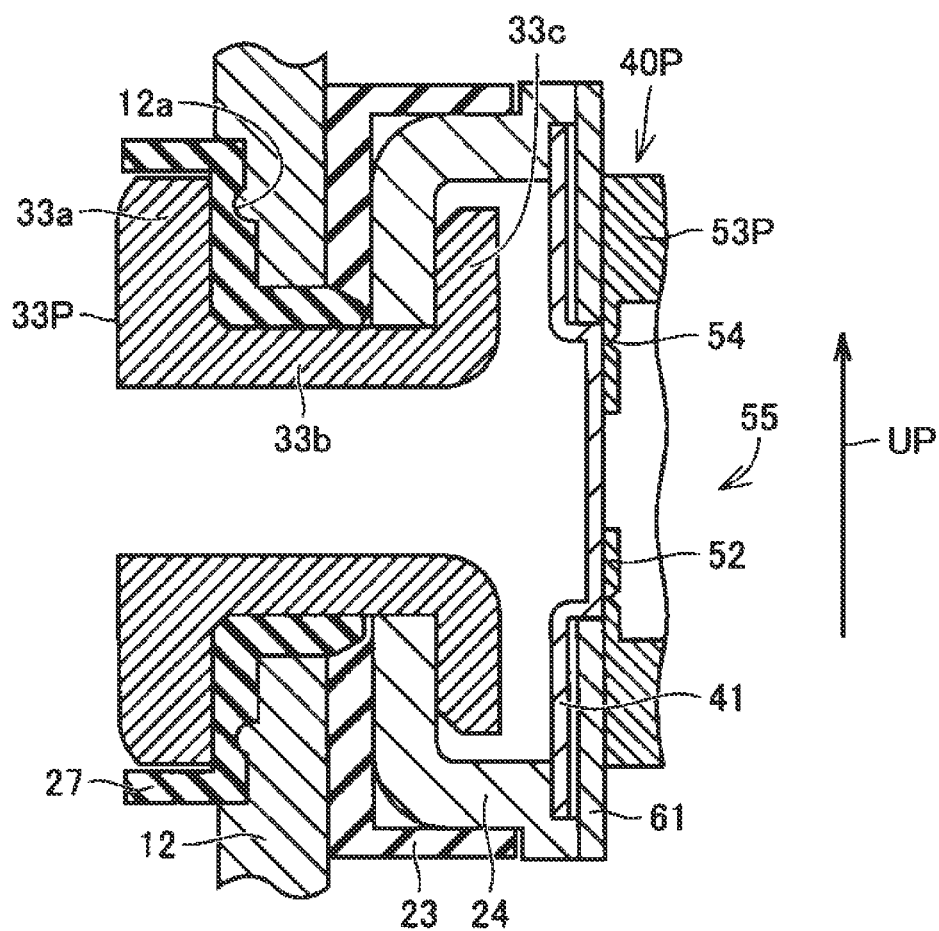
FIG. 2 is a sectional view illustrating, in an enlarged manner, a part surrounded by II in the battery illustrated in FIG. 1.

FIG. 2 is a sectional view illustrating, in an enlarged manner, a part surrounded by II in the first battery illustrated in FIG. 1. As illustrated in FIG. 2, an insulating plate 23, a gasket 27, an inversion plate 41, the positive electrode collector 53P, and a collector holder 61 are provided in the vicinity of the sealing plate 12.

The insulating plate 23 is provided inside the outer packaging body 10. The insulating plate 23 is placed on the sealing plate 12. The insulating plate 23 is inserted between the sealing plate 12 and a tab member 24. The insulating plate 23 is made of an insulating material, so as to electrically insulate the sealing plate 12 from the tab member 24.

The positive electrode terminal 33P is made of a conductive material. The positive electrode terminal 33P is made of a metallic material such as copper or aluminum. The positive electrode terminal 33P is passed through a through hole formed in the sealing plate 12. The positive electrode terminal 33P is connected to a conductive plate (not shown) on the outer part of the outer packaging body 10, and is electrically connected to the inversion plate 41 in the outer packaging body 10.

The positive electrode terminal 33P includes a flange 33*a*, a shaft portion 33*b*, and a distal end portion 33*c* as constituent parts.

The shaft portion 33*b* has a hollow cylindrical shape. The shaft portion 33*b* is passed through a through-hole of the sealing plate 12 so as to extend in a penetrating manner through the sealing plate 12.

The flange 33*a* is provided in an end portion of the cylindrical shaft portion 33*b* extending toward outside the outer packaging body 10. The flange 33*a* is connected to the end portion of the cylindrical shaft portion 33*b* outside the outer packaging body 10. The flange 33*a* has a flange shape extending radially outwardly from the cylindrical shaft portion 33*b*.

The distal end portion 33*c* is provided in an end portion of the shaft portion 33*b* extending in a tubular manner toward inside the outer packaging body 10. The distal end portion 33*c* is connected to the end portion of the cylindrical shaft portion 33*b* inside the outer packaging body 10. The distal end portion 33*c* has a disk shape around a center line of the shaft portion 33*b*. The distal end portion 33*c* is opposed to the sealing plate 12 with a space therebetween on one side in an extending direction of the shaft portion 33*b*, and is also opposed to the positive electrode collector 53P with a space therebetween on the other side in the extending direction of the shaft portion 33*b*.

The distal end portion 33*c* makes contact with the tab member 24. The distal end portion 33*c* is welded to the tab member 24. The insulating plate 23 and the tab member 24 are provided between the distal end portion 33*c* and the sealing plate 12.

The gasket 27 is made of an elastic resin material or a rubber material. The gasket 27 is provided in the positive electrode terminal 33P so as to make contact with the positive electrode terminal 33P. The gasket 27 is inserted between the sealing plate 12 and the positive electrode terminal 33P. An annular rib 12*a* for pressing the gasket 27 is provided in the sealing plate 12. The gasket 27 is provided as a seal material between the positive electrode terminal 33P and the sealing plate 12.

The inversion plate 41 has a flat shape having a circular plane view. The inversion plate 41 has a recessed shape such that an outer peripheral portion facing the tab member 24 approaches the positive electrode terminal 33P and a central part surrounded by the outer peripheral portion is distanced from the positive electrode terminal 33P. The inversion plate 41 has a dish shape.

The inversion plate 41 is made of a conductive material. The inversion plate 41 is placed between the distal end portion 33*c* of the positive electrode terminal 33P and the positive electrode collector 53P. The inversion plate 41 is fixed to a thin portion 52 of the positive electrode collector 53P by laser beam welding. The inversion plate 41 electrically connects the positive electrode terminal 33P to the positive electrode collector 53P.

The collector holder 61 is molded by use of high rigid insulating resin. The collector holder 61 is provided inside the outer packaging body 10. The collector holder 61 is provided as a member for holding the positive electrode collector 53P inside the outer packaging body 10. The collector holder 61 has a shape surrounding the positive electrode terminal 33P and the inversion plate 41.

The positive electrode collector 53P is held by the collector holder 61 inside the outer packaging body 10. The positive electrode collector 53P is opposed to the distal end portion 33*c* of the positive electrode terminal 33P with a space therebetween.

The positive electrode collector 53P includes the thin portion 52. An annular groove 54 is provided in the thin portion 52. The thin portion 52 has a shape thinner than other parts. The positive electrode collector 53P is connected to the inversion plate 41 at the thin portion 52. The groove 54 is formed by marking, for example.

The thin portion 52 and the inversion plate 41 constitute the current cut-off device 40P. Since a thickness of the groove 54 is thinner than its surrounding parts, the thin portion 52 can be easily broken at the groove 54. In this embodiment, the tab member 24 is provided between the current cut-off device 40P and the positive electrode terminal 33P. The current cut-off device 40P may be directly attached to the positive electrode terminal 33P. As illustrated in FIG. 2, the current cut-off device 40P may be provided in the positive electrode terminal 33P with some sort of member being provided between the current cut-off device 40P and the positive electrode terminal 33P.

A space on a positive electrode collector-53P side relative to the inversion plate 41 is sealed. The battery element 1B and the electrolytic solution 2 of FIG. 1 are enclosed in such a sealed space 55. When the electrolytic solution 2 expands or when gas is generated from the electrolytic solution 2, a pressure in the sealed space 55 increases.

The current cut-off device 40P is placed only in the positive electrode terminal 33P and is provided inside the outer packaging body 10. The current cut-off device 40P forms an electric current path between the positive electrode terminal 33P and the battery element 1B. When a pressure in the outer packaging body 10 increases, the current cut-off device 40P cuts off the electric current path. The battery 100 is provided in the movable body 150 such that the positive electrode terminal 33P provided with the current cut-off device 40P is placed on a vertically upper side relative to the negative electrode terminal 33N that is not provided with a current cut-off device and the current cut-off device 40P is placed on the vertically upper side relative to a liquid level of the electrolytic solution 2.

In a charged state before the current cut-off device 40P operates, a current flows from the positive electrode terminal 33P sequentially into the tab member 24, the inversion plate 41, the thin portion 52, the positive electrode collector 53P, and the battery element 1B. At the use of the secondary battery (at the time of discharge), the current flows in a reverse direction to the above.

(Current Cut-off Operation and Effect thereof)

Figure 3:
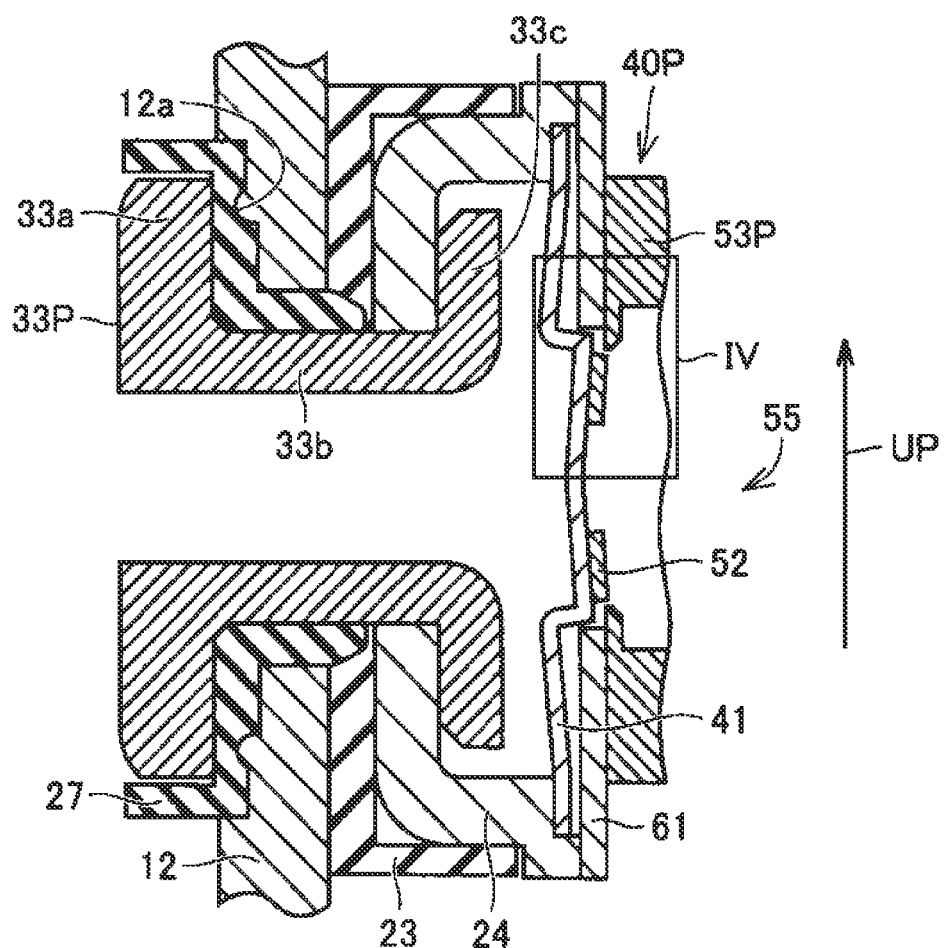
FIG. 3 is a sectional view of the battery of FIG. 2 right after an inversion plate is inverted.
Figure 4:
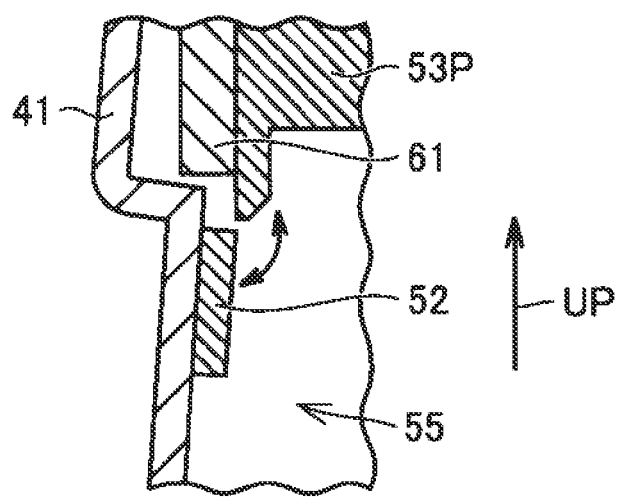
FIG. 4 is a sectional view illustrating a part surrounded by IV in FIG. 3 in an enlarged manner.

FIG. 3 is a section view of the battery of FIG. 2 after the inversion plate is inverted. FIG. 4 is a sectional view illustrating a part surrounded by IV in FIG. 3 in an enlarged manner. Referring now to FIGS. 3 and 4, when a pressure of the sealed space 55 provided inside the outer packaging body 10 suddenly increases, the thin portion 52 of the positive electrode collector 53P is pressed by gas in the outer packaging body 10. The groove 54 of the thin portion 52 breaks and the inversion plate 41 separates from the positive electrode collector 53P. This causes the inversion plate 41 not to be electrically connected to the positive electrode collector 53P. Due to such an operation of the current cut-off device 40P, a current flow between the battery element 1B and the positive electrode terminal 33P is cut off.

The inversion plate 41 thus separated from the positive electrode collector 53P is deformed in a direction distanced from the positive electrode collector 53P. More specifically, a central part of the inversion plate 41 is curved so as to be distanced from the positive electrode collector 53P. Hereby, the thin portion 52 fixed to the inversion plate 41 is separated from the positive electrode collector 53P. As a result, the inversion plate 41 is insulated from the positive electrode collector 53P.

The current cut-off device 40P is placed on the vertically upper side relative to the liquid level of the electrolytic solution 2. Accordingly, in a state where the thin portion 52 is separated from the positive electrode collector 53P, the conductive electrolytic solution 2 can hardly flow in between the positive electrode collector 53P and the thin portion 52 fixed to the inversion plate 41. As a result, electrical insulation between the positive electrode collector 53P and the inversion plate 41 can be secured.

(Structure of Movable Body Equipped with Battery according to Comparative Example)

Figure 5:
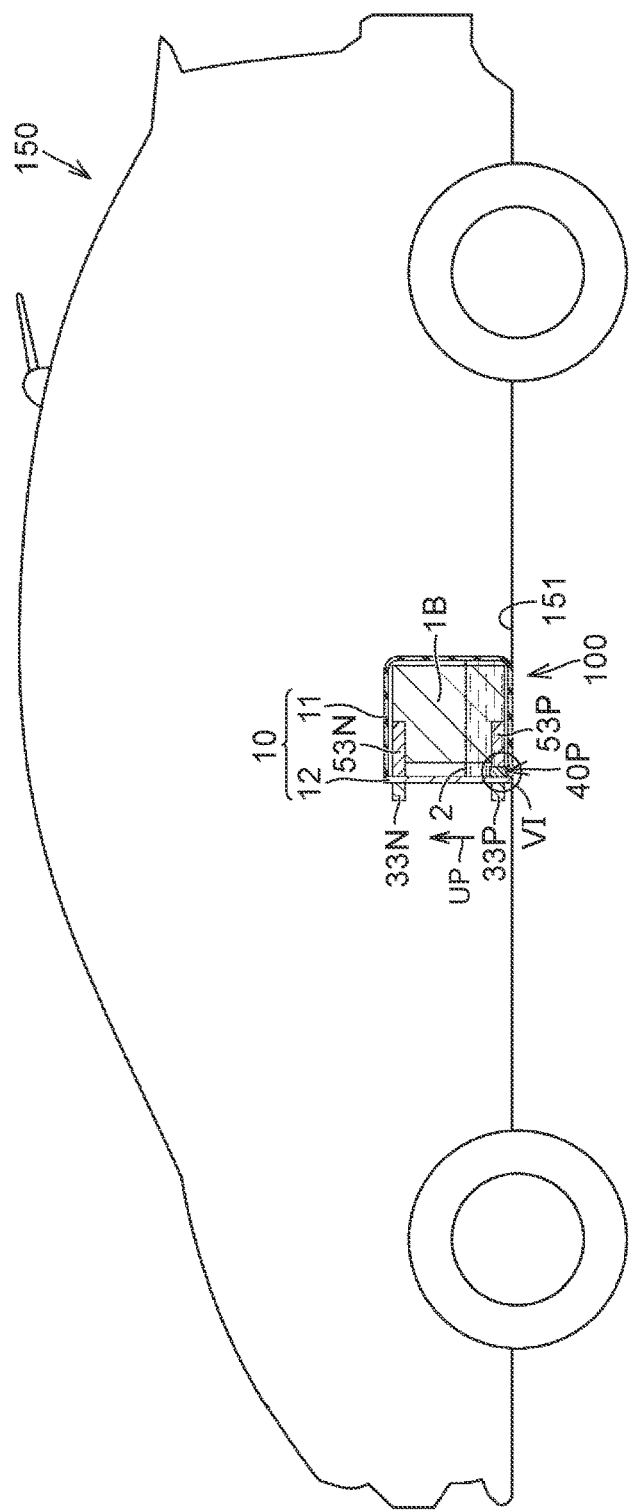
FIG. 5 is a sectional view of a movable body equipped with a first battery according to a comparative example.
Figure 6:
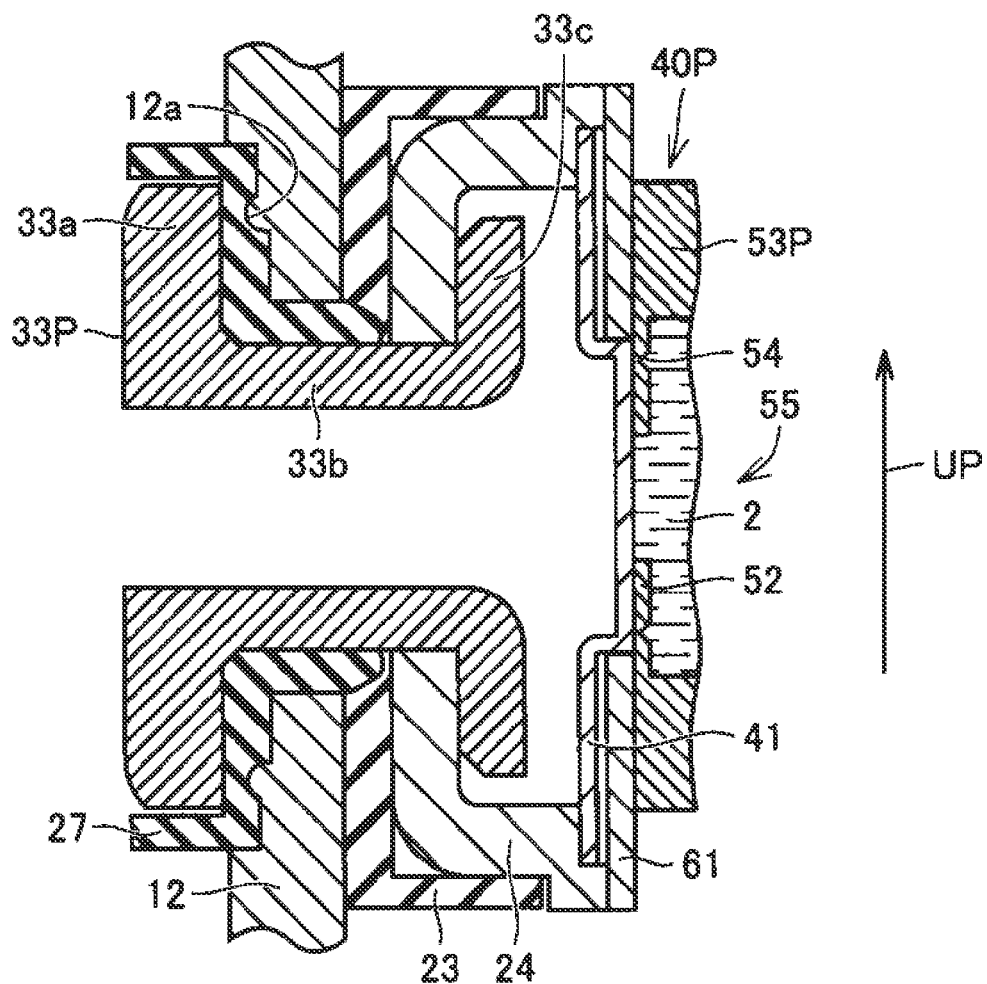
FIG. 6 is a sectional view illustrating, in an enlarged manner, a part surrounded by VI in the battery illustrated in FIG. 5.
Figure 7:
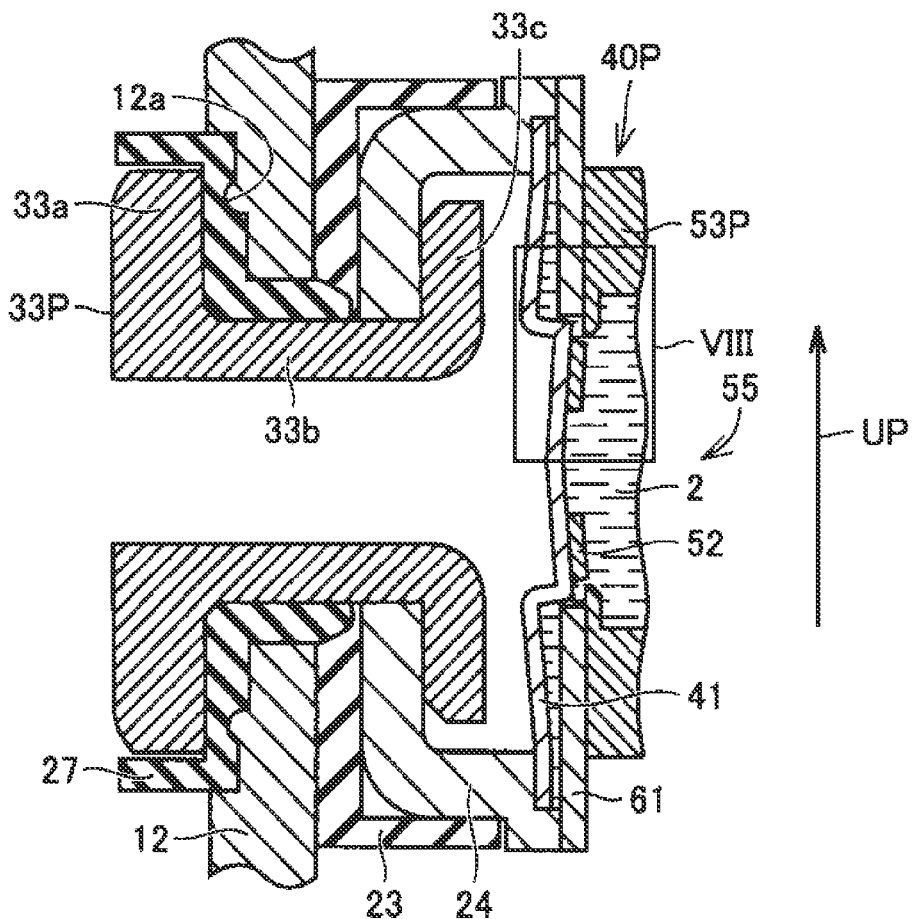
FIG. 7 is a sectional view of the battery of FIG. 6 right after an inversion plate is inverted.
Figure 8:
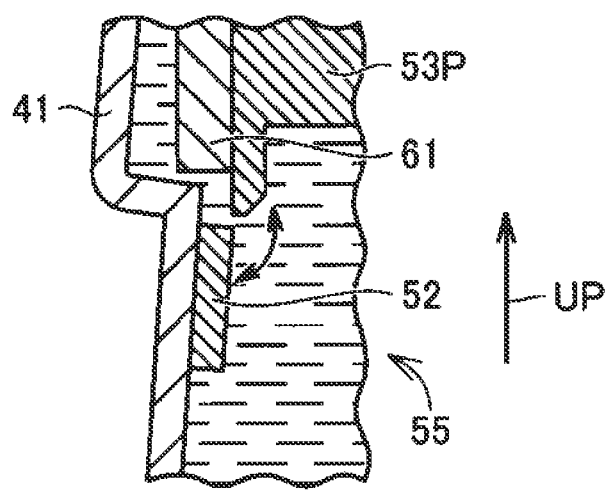
FIG. 8 is a sectional view illustrating a part surrounded by VIII in FIG. 7 in an enlarged manner.

FIG. 5 is a sectional view of a movable body equipped with a first battery according to a comparative example. FIG. 6 is a sectional view illustrating, in an enlarged manner, a part surrounded by VI in the battery illustrated in FIG. 5. FIG. 7 is a sectional view of the battery of FIG. 6 right after an inversion plate is inverted. FIG. 8 is a sectional view illustrating a part surrounded by VIII in FIG. 7 in an enlarged manner.

As illustrated in FIGS. 5 to 8, a movable body 150 equipped with a battery according to the comparative example is different from the movable body 150 equipped with the battery according to the first embodiment in that a current cut-off device 40P is immersed in an electrolytic solution 2. Since the current cut-off device 40P is immersed in the electrolytic solution 2, a thin portion 52 constituting the current cut-off device 40P is also placed in the electrolytic solution 2.

When a pressure inside an outer packaging body 10 suddenly increases, the thin portion 52 of a positive electrode collector 53P is pressed by the electrolytic solution 2 in the outer packaging body 10. A groove 54 of the thin portion 52 breaks and an inversion plate 41 separates from the positive electrode collector 53P. However, the electrolytic solution 2 flows into a broken part. As a result, the positive electrode collector 53P may be electrically conductive with the thin portion 52 again.

In contrast, in the structure according to the first embodiment, it is possible to prevent the electrolytic solution 2 from flowing in between the positive electrode collector 53P and the inversion plate 41, so that it possible to surely cut off the current in comparison with the structure according to the comparative example.

(Structure and Effect of Movable Body Equipped with Battery according to Second Embodiment)

Figure 9:
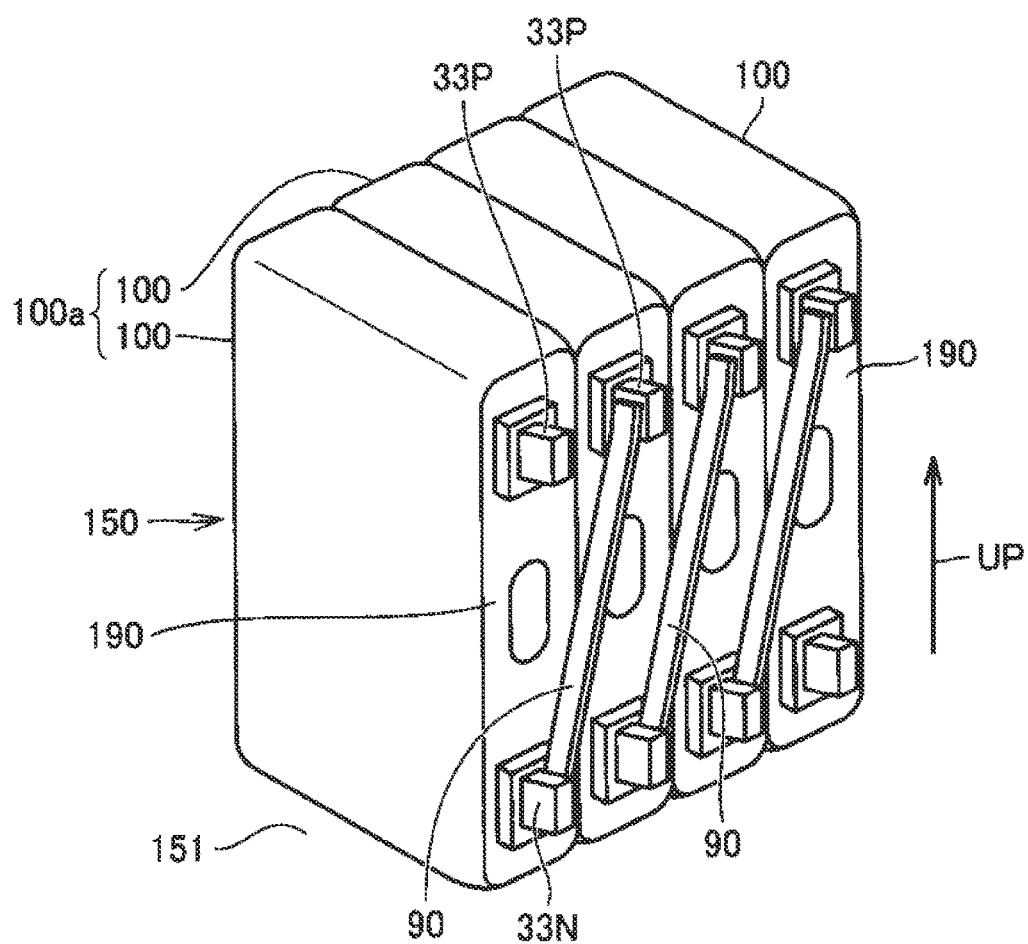
FIG. 9 is a perspective view according to a second embodiment.

FIG. 9 is a perspective view according to the second embodiment. As illustrated in FIG. 9, a plurality of batteries 100 constitutes an assembled battery 100a in the second embodiment. In the assembled battery 100a, a current cut-off device 40P (not shown in FIG. 9) is placed only in a positive electrode terminal 33P. In each battery 100, a current cut-off device 40P is placed on a vertically upper side relative to a liquid level of an electrolytic solution 2, as illustrated in FIG. 1.

An outer surface of each of the plurality of batteries 100 as a first battery and a second battery includes a plane 190 as a first plane and a second plane. A positive electrode terminal 33P and a negative electrode terminal 33N are provided on the same plane 190. The plurality of batteries 100 is stacked so that a plurality of planes 190 constitutes the same plane. A positive electrode terminal 33P of a battery 100 is connected to a negative electrode terminal 33N of its adjacent battery 100 via a bus bar 90. Hereby, the plurality of batteries 100 is connected in series to each other.

The movable body according to the second embodiment thus configured has the same effect as the movable body 150 of the first embodiment. Further, an assembled battery 100a can be constituted by combining a plurality of batteries 100 having the same structure. As a result, the number of types of battery is not increased. Further, prismatic batteries 100 are stacked so that their respective planes 190 constitute the same plane, and hereby, the batteries 100 can be provided in the movable body 150 with a high density.

(Structure and Effect of Movable Body Equipped with Battery according to Third Embodiment)

Figure 10:
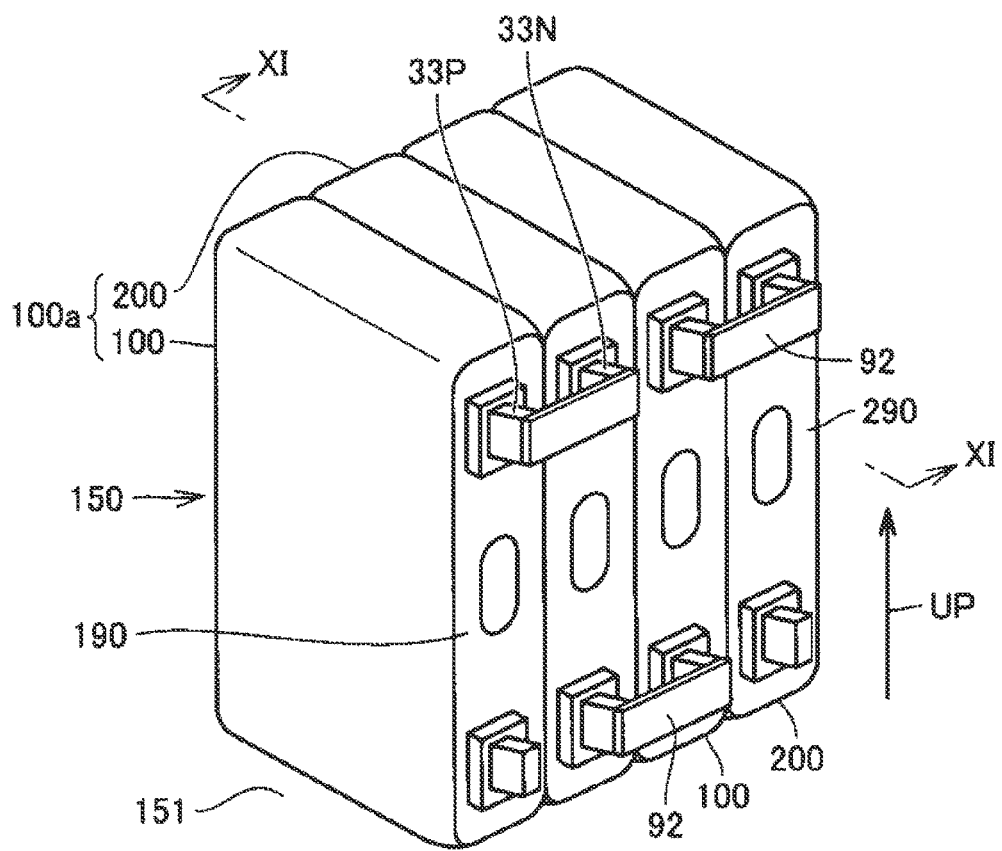
FIG. 10 is a perspective view according to a third embodiment.

FIG. 10 is a perspective view according to a third embodiment. As illustrated in FIG. 10, a plurality of batteries 100 and batteries 200 constitutes an assembled battery 100a in the third embodiment. In the battery 100, a current cut-off device is placed only in a positive electrode terminal 33P. The battery 100 has the structure as illustrated in FIGS. 1 to 4. In the battery 200, a current cut-off device is placed on a negative electrode terminal-33N side.

The positive electrode terminal 33P of the battery 100 is connected to the negative electrode terminal 33N of the battery 200 via a bus bar 92. A negative electrode terminal 33N of the battery 100 is connected to a positive electrode terminal 33P of the battery 200 via a bus bar 92.

Figure 11:
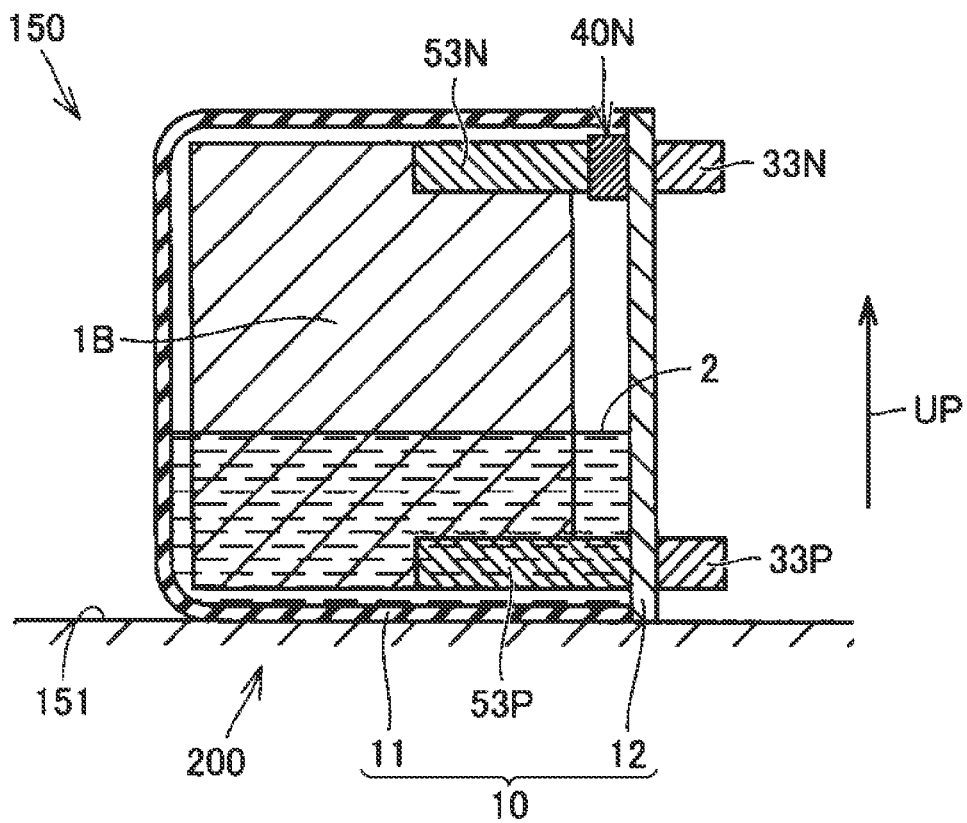
FIG. 11 is a sectional view taken along a line XI-XI in FIG. 10.

FIG. 11 is a sectional view taken along a line XI-XI in FIG. 10. As illustrated in FIG. 11, in the battery 200, the positive electrode terminal 33P is placed on a lower side, and the negative electrode terminal 33N is placed on a vertically upper side. A current cut-off device 40N is provided only in the negative electrode terminal 33N. The current cut-off device 40N has the same structure as the current cut-off device 40P according to the first embodiment. The current cut-off device 40N is provided between a negative electrode collector 53N and the negative electrode terminal 33N. The current cut-off device 40N is provided on the vertically upper side relative to a liquid level of an electrolytic solution 2.

Respective outer surface of the battery 100 as a first battery and the battery 200 as a second battery include a plane 190 as a first plane and a plane 290 as a second plane.

A positive electrode terminal 33P and a negative electrode terminal 33N are provided on the same plane 190, 290. The plurality of batteries 100, 200 is stacked so that a plurality of planes 190, 290 constitutes the same plane. A positive electrode terminal 33P of a battery 100 is connected to a negative electrode terminal 33N of an adjacent battery 200 via a bus bar 92. Hereby, the plurality of batteries 100, 200 is connected in series to each other.

In the movable body according to the third embodiment thus configured, the positive electrode terminal 33P of the battery 100 is placed adjacent to the negative electrode terminal 33N of the battery 200. Accordingly, a length of the bus bar 92 that connects them is short. As a result, an electric resistance in the bus bar 92 can be lowered. Further, it is possible to reduce a cost of the bus bar 92. Further, since the bus bar 92 is short, it is possible to reduce the bus bar 92 in weight. Further, prismatic batteries 100, 200 are stacked so that their respective planes 190, 290 constitute the same plane, so the batteries 100, 200 can be provided with a high density.

(Structure and Effect of Movable Body Equipped with Battery according to Fourth Embodiment)

Figure 12:
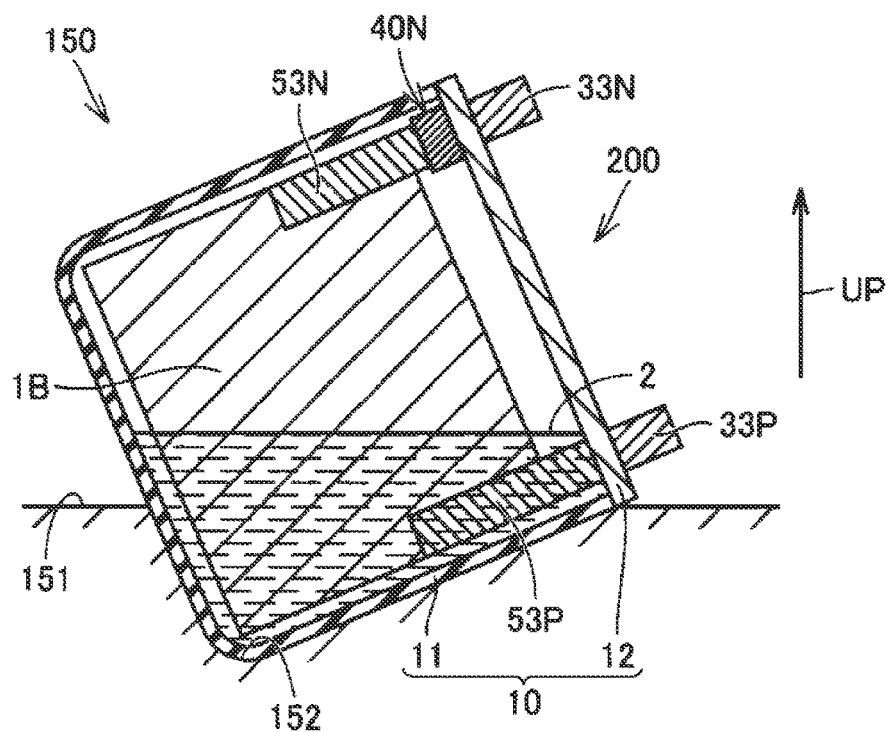
FIG. 12 is a sectional view of a movable body equipped with a battery according to a fourth embodiment.

FIG. 12 is a sectional view of a movable body equipped with a battery according to the fourth embodiment. Referring now to FIG. 12, in a structure according to the fourth embodiment, a battery 200 is provided on a mounting surface 151 in an inclined manner. By fitting an outer packaging body 10 to a recessed portion 152 of the mounting surface 151, the battery 200 can be inclined.

Further, in the present embodiment, similarly to FIG. 11, a negative electrode terminal 33N is provided on a vertically upper side relative to a positive electrode terminal 33P. A current cut-off device 40N is provided so as to be adjacent to the negative electrode terminal 33N. The current cut-off device 40N is placed on the vertically upper side relative to a liquid level of an electrolytic solution 2.

Even the movable body 150 configured as such has the same effect as the movable body 150 of the first embodiment.

Figure 13:
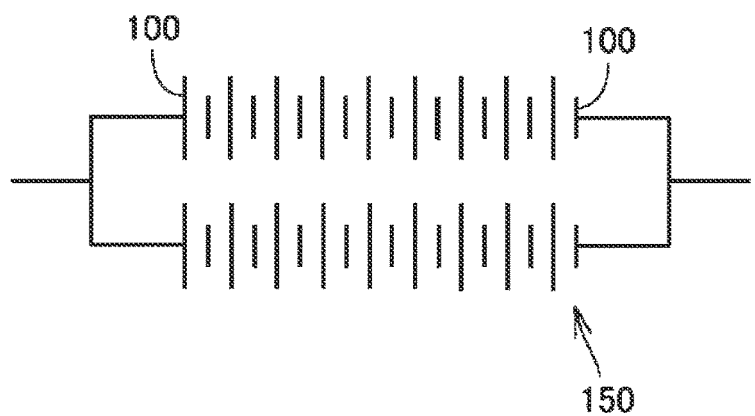
FIG. 13 is a circuit diagram of an assembled battery.

The embodiments of the present disclosure have been described as such, but the embodiments illustrated herein can be modified variously. First, in the second and third embodiments, the assembled battery 100a is configured such that a plurality of batteries is connected in series, but an assembled battery may be configured such that a plurality of batteries is connected in parallel. Further, as illustrated in FIG. 13, an assembled battery may be configured such that a plurality of batteries 100 is connected in series and in parallel.

It should be considered that the embodiments and examples described herein are just examples in all respects and are not limitative.

The present disclosure can be applied to a secondary battery including a current cut-off device particularly advantageously.

What is claimed is:

1. A movable body comprising
a battery including:
a battery element;
an outer packaging body configured to accommodate the battery element;
an electrolytic solution enclosed inside the outer packaging body;
a positive electrode terminal and a negative electrode terminal, each including a part provided outside the outer packaging body and a part provided inside the outer packaging body, and electrically connected to the battery element; and
a current cut-off device placed inside the outer packaging body, the current cut-off device being provided only with one of the positive electrode terminal and the negative electrode terminal so as to form an electric current path between the battery element and the one of the positive electrode terminal and the negative electrode terminal, the current cut-off device being configured to cut off the electric current path when a pressure in the outer packaging body increases, wherein
the battery is provided in the movable body as a power source for the movable body such that the one of the positive electrode terminal and the negative electrode terminal that is provided with the current cut-off device, is placed on a vertically upper side relative to the other one of the positive electrode terminal and the negative electrode terminal, the current cut-off device is placed on the vertically upper side relative to a liquid level of the electrolytic solution, and the part of the other one of the positive electrode terminal and the negative electrode terminal that is provided inside the outer packaging body is completely immersed in the electrolytic solution.

2. The movable body according to claim 1, wherein:
the movable body includes a plurality of batteries including a first battery and a second battery;
the plurality of batteries is connected in series so as to constitute an assembled battery;
the movable body is equipped with the assembled battery;
the current cut-off devices of the first battery and the second battery are provided respectively in the positive electrode terminals of the first battery and the second battery or provided respectively the negative electrode terminals of the first battery and the second battery; and
the assembled battery includes a bus bar that connects the first battery to the second battery in series.

3. The movable body according to claim 1, wherein:
the movable body includes a plurality of batteries including a first battery and a second battery;
the plurality of batteries is connected in series so as to constitute an assembled battery;
the movable body is equipped with the assembled battery;
the current cut-off device of the first battery is provided only in the positive electrode terminal of the first battery;
the current cut-off device of the second battery is provided only in the negative electrode terminal of the second battery;
the first battery and the second battery are stacked alternately;
a distance between the positive electrode terminal of the first battery and the negative electrode terminal of the second battery is shorter than a distance between the positive electrode terminal of the first battery and the positive electrode terminal of the second battery; and
the assembled battery includes a bus bar that connects the positive electrode terminal of the first battery to the negative electrode terminal of the second battery.

4. The movable body according to claim 2, wherein:
the first battery is prismatic;
the positive electrode terminal and the negative electrode terminal of the first battery are provided on the same first plane, the first plane being an outer surface of the first battery;

the second battery is prismatic;
the positive electrode terminal and the negative electrode terminal of the second battery are provided on the same second plane, the second plane being an outer surface of the second battery;
the first battery and the second battery have the same outer shape; and
in the assembled battery, the first battery and the second battery are stacked such that the first plane and the second plane are placed on the same plane.

* * * * *